United States Patent
Bae et al.

[11] Patent Number: 5,813,838
[45] Date of Patent: *Sep. 29, 1998

[54] OPTIMUM ELECTROLYTE LEVEL SENSING METHOD AND THE AUTOMATIC TOPPING UP APPARATUS FOR STORAGE WET CELL

[75] Inventors: Sang-Min Bae, Gasuwon-Dong; Young-Joon Son; Jae-Won Lee, both of Eoeun-Dong, all of Rep. of Korea

[73] Assignee: Korea Atomic Energy Research Institute, Daejeon-Si, Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 556,837

[22] Filed: Nov. 2, 1995

[30] Foreign Application Priority Data

Jun. 2, 1995 [KR] Rep. of Korea .................. 1995-14639

[51] Int. Cl.$^6$ .................................................. F04B 49/00
[52] U.S. Cl. ................................ 417/18; 417/37; 417/40; 417/41; 417/53; 429/64
[58] Field of Search ................................ 417/17–18, 23, 417/28, 36–37, 40–41, 53; 137/428, 409; 320/30, 48; 429/14, 64, 74, 92

[56] References Cited

U.S. PATENT DOCUMENTS

| | | | |
|---|---|---|---|
| 4,045,721 | 8/1977 | Swain | 320/43 |
| 4,146,684 | 3/1979 | Fischer et al. | 429/104 |
| 4,284,951 | 8/1981 | Dahl et al. | 324/430 |
| 4,289,176 | 9/1981 | Evans | 141/35 |
| 4,359,071 | 11/1982 | d'Arcy et al. | 141/1 |
| 4,522,896 | 6/1985 | Iseard | 429/63 |
| 4,801,511 | 1/1989 | Young | 429/198 |
| 4,913,987 | 4/1990 | Dattilo | 429/92 |
| 5,139,894 | 8/1992 | Mizuno et al. | 429/9 |
| 5,340,281 | 8/1994 | Su | 417/40 |
| 5,340,667 | 8/1994 | Stinson et al. | 429/64 |
| 5,453,334 | 9/1995 | Melichar | 429/64 |
| 5,543,243 | 8/1996 | Brecht | 429/51 |
| 5,615,717 | 4/1997 | Cheiky | 141/100 |

OTHER PUBLICATIONS (1) Derwent WPI. (c) 1995, WPI Acc. No. 87–333010/47.
(2) Derwent WPI. (c) 1995, WPI Acc. No. 86–062761/10.
Handbook of Batteries and Power Cells, David Linden, Macraw Hill 1P84.
ANSI/IEEE Std 450–1987–"IEEE Recommended Practice for Maintenance, Testing, and Replacement of Large Lead Storage Batteries for Generating Stations and Substations". pp. 1086–1100. (1987).
ANSI/IEEE Std 1106–1987–"IEEE Recommended Practive for Maintenance, Testing, and Replacement of Nickel–Cadmium Storage Batteries for Generating Stations and Substations". pp. 0937–0944. (1987).

*Primary Examiner*—Ayaz R. Sheikh
*Assistant Examiner*—Xuan M. Thai
*Attorney, Agent, or Firm*—Armstrong, Westerman, Hattori, McLeland & Naughton

[57] ABSTRACT

The optimum electrolyte level sensing method and the automatic topping up apparatus for storage wet cell are disclosed. The difference in the conductivities between the distilled water and the electrolyte is utilized. An injection outlet portion(15), an adjust ring(14), and two wires are used to detect the optimum electrolyte level to supply distilled water to storage cells. The feedback control to maintain the constant optimum electrolyte level of storage cells is carried out by a single microprocessor.

1 Claim, 4 Drawing Sheets

OPTIMUM ELECTROLYTE LEVEL SENSING METHOD AND THE AUTOMATIC TOPPING UP APPARATUS FOR STORAGE WET CELL

FIELD OF THE INVENTION

The present invention relates to an optimum electrolyte level sensing method of a storage wet cell for maintaining the maximum energy efficiency of a battery which is a means of storing an emergency power. The present invention also relates to an automatic topping up apparatus for a storage wet cell.

DESCRIPTION OF THE PRIOR ART

Generally, storage cells are used as an energy storing means in an uninterrupted power supply system (U.P.S.) or an ocean going vessel. Such storage cells are connected in series on a large scale. Under such a circumstance, the optimum electrolyte level of storage cells has to be known for the maximum energy efficiency. For example, ANSI/IEEE Std. 450-1987 and 1106-1987 describe "When it becomes necessary to add water, fill all cells to the maximum level with distilled or other approved quality water." Further, in "Handbook of Batteries and Fuel Cells" (1984), David Linden described "Automatic watering devices and reliability testing can reduce maintenance labor costs further."

The conventional apparatuses for supplying the optimum amount of distilled water to storage cells can be cited as follows.

One of them is the Russian Patent SU-1261529. This patent includes overflow pipes, an electrical control circuit, and an electrolytic valve. The valve is activated in accordance with the number of control windings of relay. The fluid would be injected by the activation of the valve. If the inductance of the wire of relay is varied, it is hard to keep an optimum electrolyte level of storage cells. In that case, the feedback control to maintain the optimum electrolyte level of storage cells is impossible.

Another is the German Patent DE-3430681. This patent includes a float valve in an water feed reservoir and a siphon between and the battery. In this apparatus, the electrolyte is injected by a siphon. If the air is introduced into a siphon by a natural cause or lowering of the water level within the reservoir, then the electrolyte cannot be injected. Furthermore, it is imnmovable, and the feedback control to maintain the optimum electrolyte level of storage cells is impossible.

Another is the U.S. Pat. No. 4,833,017. This patent includes a tube, a thin film, and a valve. When the valve is operated by the movement of the thin film, the electrolyte is injected or not. In this apparatus, if the structure and the position of the thin film are changed, the electrolyte may overflow. Furthermore, the feedback control to maintain the optimum electrolyte level of storage cells is impossible.

Still another is the U.S. Pat. No. 4,386,141. This patent includes a plug with a float and a valve. When the valve is operated by the movement of the float, the electrolyte is injected or not In this apparatus, the small float may cause a disorder, and the distilled water is being continuously injected during the operation interval of float. Furthermore, the feedback control to maintain the optimum electrolyte level of storage cells is impossible.

SUMMARY OF THE INVENTION

The present invention is intended to overcome the above described disadvantages of the conventional techniques.

Therefore, the objective of the present invention is to provide the optimum electrolyte level and to automatically top up for storage wet cell by the feedback control.

The optimum electrolyte level sensing method, which has not been employed in conventional methods, is characterized as follows: the principle that "The distilled water does not allow electric current to flow, but the electrolyte does allow." it is utilized. Therefore, the sensing structure using the difference in conductivities between the distilled water and the electrolyte is simple, and disorders of the apparatus can hardly occur. The feedback signal by the detection of the optimum electrolyte level precisely controls the injection of the distilled water by a microprocessor.

DESCRIPTION OF THE PREFERRED EMBODIMENT

Figure 1:
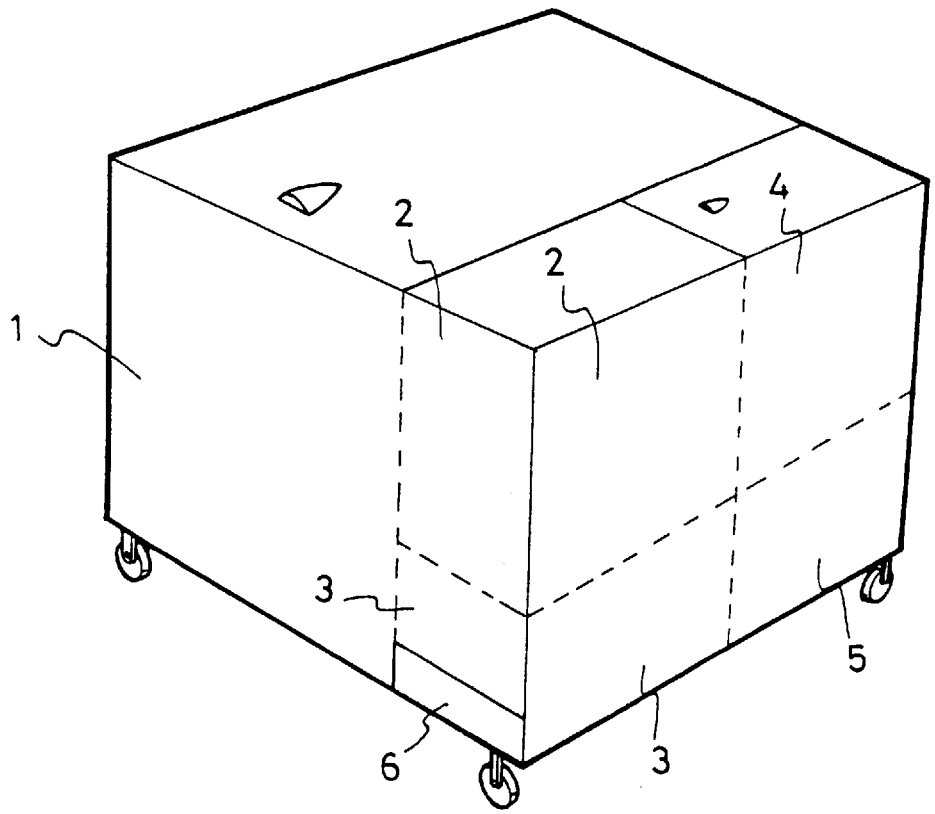
FIG. 1 is a schematic perspective view of the movable automatic distilled water injection apparatus for storage cells.

FIG. 1 is a schematic perspective view of the movable automatic distilled water injection apparatus for storage cells in the present invention. The apparatus has a hexahedral shape with four wheels attached. This hexahedral box includes a distilled water storage tank (1), an internal part box(2), a return reel(3) for the control wire and an injection hose, an injector placing room(4), another return reel(5) for the power source wire, and a connecting terminal box(6).

Figure 2:
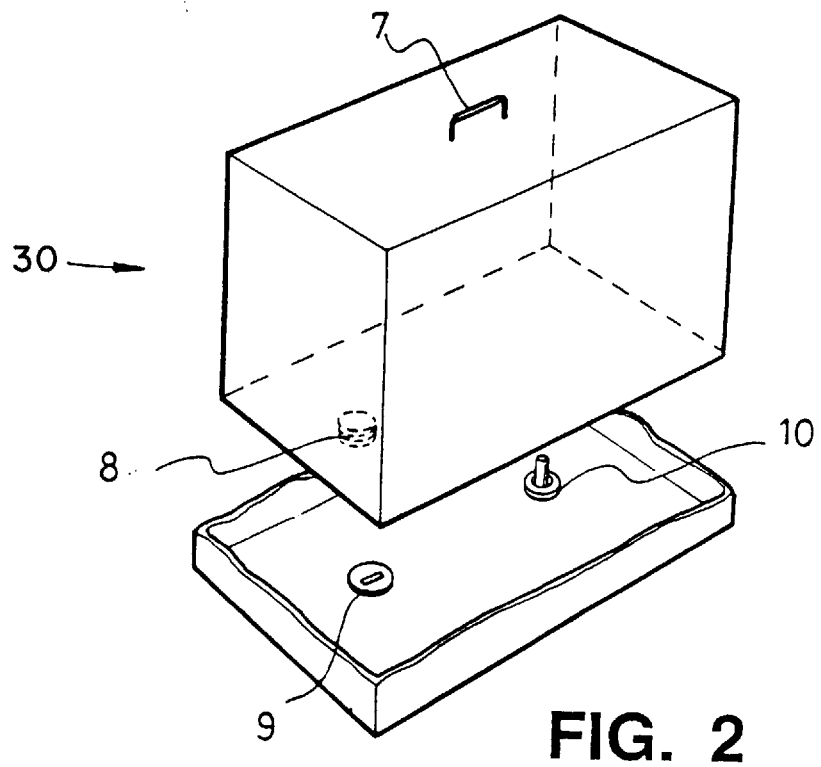
FIG. 2 illustrates the constitution of the distilled water storage tank as a part of FIG. 1.

The distilled water storage tank(1) includes a distilled water storage vessel(30). As shown in FIG. 2, this distilled water storage vessel(30) includes a plug(8), a plug opening rod(9), a float sensor(10), and a handle(7). The distilled water storage vessel(30) with the handle(7) attached thereon has the plug(8) on its bottom. The plug(8) is a rubber pad spring type check valve that can be opened and closed by the plug opening rod(9). the float sensor(10) which is made of a permanent magnet for driving a lead switch generates a distilled water supplement signal.

The procedure of topping up the distilled water vessel(30) is as follows. First, the lid of the distilled water storage tank(1) is opened, and the distilled water storage vessel(30) is taken out. Second, the distilled water is filled into the distilled water storage vessel(30), and then the vessel(30) is put back into the distilled water storage tank(1) with the plug(8) being directed downward. Then, the lid of the injector placing room(4) is opened to take out a distilled water injector.

Figure 3:
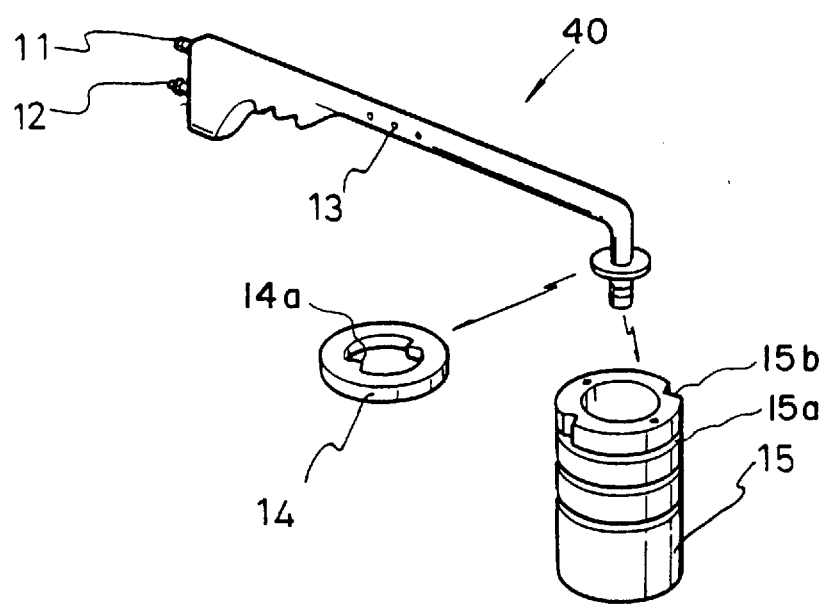
FIG. 3 illustrates the constitution of the distilled water injector as a part of FIG. 1.

The distilled water injector placed in the injector placing room(4) is constituted as illustrated in FIG. 3. The distilled water injector includes an arc shaped body(40), a control wire connector(11), an injection hose quick coupling(12), a control switch and indicating lamps (13), an adjusting ring (14), and an injection outlet portion(15). The control wire and the injection hose are to be connected to the control wire connector(11) and to the injection hose quick coupling(12)

in the connecting terminal box(6). The control wire consists of 8 lines. It drives the solenoid valve and the pump to transmit the output from the float sensor, and to supply control electric power. Then, through the injection outlet portion(15) attached to the leading end of the distilled water injector, the distilled water is injected into storage cell.

The injection outlet portion(15) is provided with horizontal annular grooves(15a) at vertical intervals of 5 mm and a pair of V shaped vertical grooves(15b). The adjusting ring (14) is provided with a pair of V shaped projections(14a) which are to be coupled with the V cross-sectioned grooves (15b). Thus, the adjusting ring(14) with the V shaped projection(14a) is moved up and down through the V shaped grooves(15b). At an optimum level of the electrolyte, the adjusting ring(14) can be rotated along the horizontal annular grooves(15a).

Thus, in accordannce with the optimum level of the electrolyte of the storage cell, the end of the injection portion is controlled by the adjusting ring(14). The handle of the distilled water injector is held by hand, and the injection outlet portion is put into the hole of storage cell. If the injection switch(13) is pressed by a thumb, then the distilled water is filled up to the optimum level automatically. In this way, all the adjacent storage cells are filled with the distilled water up to the optimum level in a continuous manner.

After filling up to the optimum level, the injection is stopped in the following manner. Although the drawings do not illustrate, the interior of the injection outlet portion(15) is provided with two wires for sensing the optimum electrolyte level. These two wires are exposed by about 1 mm from the lower end of the injection outlet to detect the optimum electrolyte level automatically. Because the distilled water has no ionic component, the sensing wires are not corroded.

As all external power source, DC 12V or AC 220/110V, which is readily available, is used. The internal component box of the main body includes a circuit board for converting AC 220/110V into DC 12V to drive a distilled water injection pump and a solenoid valve. All the wires are connected through connectors, so that they can be disassembled easily.

Figure 4:
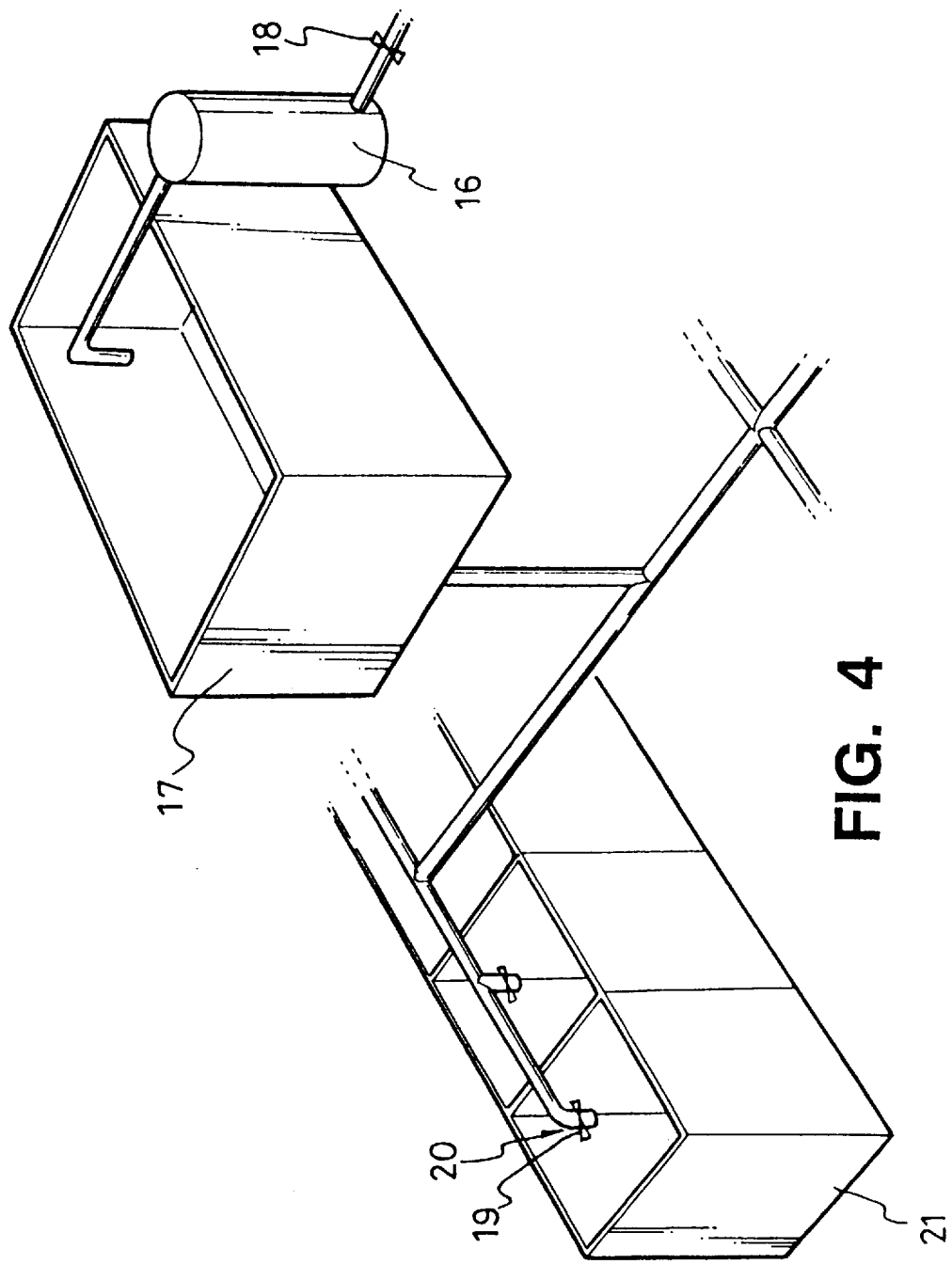
FIG. 4 illustrates the constitution of the unmanned automatic demineralized water injection apparatus for storage cells as another embodiment of the present invention.

FIG. 4 illustrates the constitution of the unmanned automatic demineralized water injection apparatus for the storage cells as another embodiment of the present invention. This is not a movable distilled water injection apparatus as shown in FIG. 1, but a kind of fixed system to supply the demineralized water into the storage cells to the optimum electrolyte level automatically. This unmanned demineralized water injection apparatus includes: a demineralized water making device(16), a demineralized water storage tank(17), a solenoid valve(18) installed on a supplying tube and connected to the demineralized water making device (16), a group of solenoid valves(19), a group of sensors(20) to detect the optimum electrolyte level, and a group of storage cells(21).

Through the supplying tube connected to the demineralized water making device(16), the city water is supplied to the demineralized water making device(16). The amount of demineralized water is adjusted by the solenoid valve(18) installed on the supplying tube. If the electrolyte level of a group of storage cells(21) is low, demineralized water supply signals, generated by a group of the electrolyte level sensors(20), activate a group of solenoid valves (19) automatically. Therefore, a proper amount of demineralized water is supplied to a group of storage cells(21). In this manner, demineralized water is automatically supplied to storage cells.

Figure 5:
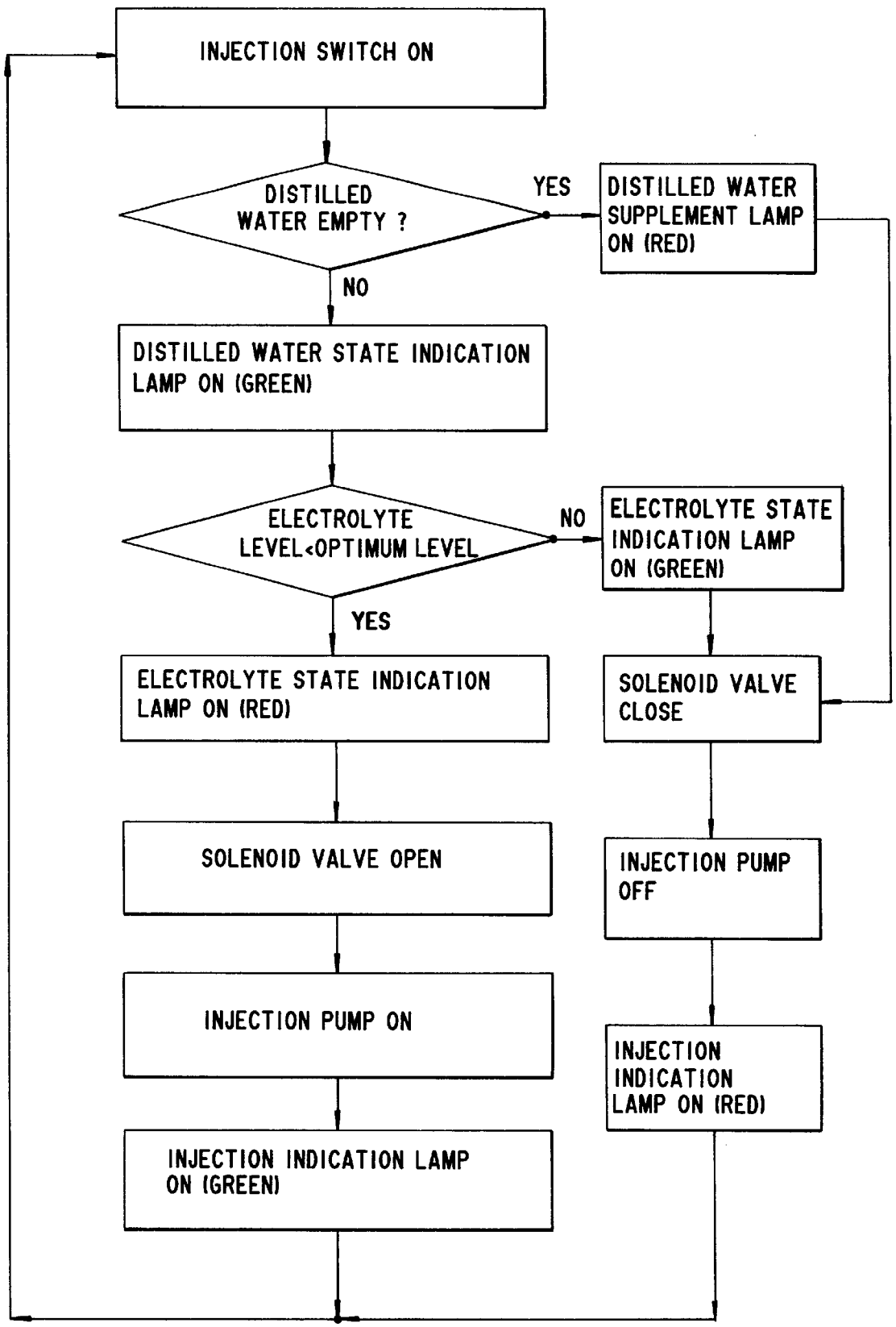
FIG. 5 is a control flow chart of the movable automatic distilled water injection apparatus for storage cells.

FIG. 5 is a control flow chart of the movable automatic distilled water injection apparatus for storage cells shown in FIG. 1. If the distilled water injection switch is pressed, the state of sufficiency or insufficiency in distilled water level is indicated by the signal from the lead switch operated by the permanent magnet float sensor. In case of insufficiency, the operation of solenoid valve and the injection pump is automatically stopped. An electrolyte sufficiency is determined by an electrolyte level signal from the electrolyte level sensor. When the electrolyte reaches the optimum level, the operation of the solenoid valve and the injection pump is automatically halted. This control loop is designed for a worker to fill distilled water in a continuous manner. The control circuit is operated by a single microprocessor.

The present invention has the following advantages.

First, through the particular injection outlet and the adjusting ring, the optimum level of electrolyte can be detected regardless of the kind of storage cells.

Second, in case of unmanned automatic demineralized water injection apparatus as a permanently installed system, the gravity of water is utilized as the injection power. Meanwhile, in case of movable automatic distilled water injection apparatus, DC 12V or AC 220/110V is used as a power source. Especially, DC 12V is readily available from the combination of adjacent storage cells.

Third, the difference in conductivities between the distilled water and the electrolyte is adopted as the criterion to detect the optimum electrolyte level, so that, the structure is simple and disorders are not likely to occur. Furthermore, the feedback signal by the detection of the optimum electrolyte level precisely controls the injection of the distilled water by a single microprocessor.

Fourth, a lead switch operated by the permanent magnet float sensor is to detect the existence or the level of distilled water, and therefore, disorders in many conventional switches are not likely to occur.

Fifth, as the design of apparatus is based on the principle of the somatological engineering, the injector can be held conveniently by the hand and the control switch can be pressed by a thumb.

Sixth, single microprocessor is used to carry out the control logic, so that the control circuit is simple and easy to manufacture.

Seventh, the electrolyte level which is the most important factor for the life expectancy of storage cells is maintained at the optimum level all the time.

Therefore, the life expectancy of expensive storage cells is extended, but the depreciation rate becomes low. Above of all, this invention can greatly reduce maintenance labor costs of storage cells.

What is claimed are:

1. An automatic topping up method of a storage wet cell consisting of electrolyte and distilled water, wherein said method comprising the steps of:

providing a movable automatic distilled water injection apparatus for storage cells;

sensing a distilled water level in a distilled water storage vessel of said movable automatic distilled water injection apparatus by means of a lead switch operated by a permanent magnet float sensor;

determining the amount of electrolyte in said storage wet cell by a difference between the conductivity of said electrolyte and said distilled water in said storage wet cell;

automatically activating a pump and a solenoid valve to supply distilled water into said storage wet cell when the amount of electrolyte in said storage wet cell is insufficient and when the sensed distilled water level in said distilled water storage vessel is above a predetermined level; and automatically stopping said pump and said solenoid valve to terminate supplement of distilled water upon an optimum amount of electrolyte being determined or when the sensed distilled water level in said distilled water storage vessel falls below a predetermined level.

* * * * *